United States Patent
Fang et al.

(10) Patent No.: US 9,552,452 B2
(45) Date of Patent: *Jan. 24, 2017

(54) METHOD AND APPARATUS FOR FLIP CHIP PACKAGING CO-DESIGN AND CO-DESIGNED FLIP CHIP PACKAGE

(71) Applicant: MEDIATEK INC., Hsin-Chu (TW)

(72) Inventors: Jia-Wei Fang, Hsinchu (TW); Shen-Yu Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/088,109

(22) Filed: Mar. 31, 2016

(65) Prior Publication Data
US 2016/0217244 A1   Jul. 28, 2016

Related U.S. Application Data

(63) Continuation of application No. 14/535,328, filed on Nov. 7, 2014, now Pat. No. 9,305,131.

(60) Provisional application No. 61/911,021, filed on Dec. 3, 2013.

(51) Int. Cl.
G06F 17/50   (2006.01)
H01L 23/00   (2006.01)

(52) U.S. Cl.
CPC ....... *G06F 17/5072* (2013.01); *G06F 17/5077* (2013.01); *G06F 17/5081* (2013.01); *G06F 2217/40* (2013.01); *G06F 2217/78* (2013.01); *H01L 24/06* (2013.01); *H01L 24/14* (2013.01); *H01L 2224/0612* (2013.01); *H01L 2224/1412* (2013.01); *H01L 2924/15311* (2013.01)

(58) Field of Classification Search
USPC ................. 716/111, 118, 120, 126
See application file for complete search history.

(56) References Cited

U.S. PATENT DOCUMENTS

| | | | | |
|---|---|---|---|---|
| 8,006,216 B1* | 8/2011 | Chen | ................... | G06F 17/5077 716/126 |
| 2006/0214307 A1* | 9/2006 | Chang | ................. | G06F 17/5068 257/778 |
| 2007/0094630 A1* | 4/2007 | Bhooshan | ........... | G06F 17/5077 716/112 |
| 2008/0086710 A1* | 4/2008 | Huynh | ................ | G06F 17/5072 716/119 |
| 2008/0104554 A1* | 5/2008 | Kobayashi | .......... | G06F 17/5036 716/112 |
| 2012/0129301 A1* | 5/2012 | Or-Bach | ................. | G11C 8/16 438/129 |

(Continued)

*Primary Examiner* — Brian Ngo
(74) *Attorney, Agent, or Firm* — Winston Hsu; Scott Margo

(57) ABSTRACT

The present invention provides a method for flip chip packaging co-design. The method comprises steps of: providing an I/O pad information of a chip and a connection information of a PCB; performing a first I/O pad placement according to the I/O pad information of the chip and the connection information of the PCB; utilizing a RDL routing analysis device to perform a bump pad pitch analysis for the first I/O pad placement of the chip to generate a bump pad pitch analysis result; performing a bump pad planning for a package according to the bump pad pitch analysis result to generate a bump pad planning result; and performing a second I/O pad placement for the chip according to the bump pad planning result to generate an I/O pad placement result.

20 Claims, 12 Drawing Sheets

(56) References Cited

U.S. PATENT DOCUMENTS

2012/0216164 A1\* 8/2012 Graf ...................... H01L 24/48
716/120

\* cited by examiner

METHOD AND APPARATUS FOR FLIP CHIP PACKAGING CO-DESIGN AND CO-DESIGNED FLIP CHIP PACKAGE

CROSS REFERENCE TO RELATED APPLICATION

This application is a continuation application of U.S. application Ser. No. 14/535,328, filed on Nov. 7, 2014, which claims the benefit of U.S. Provisional Application No. 61/911,021, filed on Dec. 3, 2013, and included herein by reference.

BACKGROUND

The disclosed embodiments of the present invention relate to a method for flip chip packaging co-design, and more particularly, to a method for flip chip packaging co-design which can provide a bi-directional flip-chip co-design flow, analyze chip-aware bump pitches, simulate IR-aware bump counts/locations, speed up design cycle, as to increase design quality, and lower design cost.

Conventional methods of using regular bump patterns to do flip-chip co-design have already been disclosed and discussed in various literatures, such as U.S. Pat. No. 7,117,467. However, the conventional methods do not consider Input/Output (I/O) pad and/or redistribution layer (RDL) requirements and cannot handle non-uniform power domains to improve IR drops since the I/O information, the RDL routing information, and/or the power domain information of the chip and the connection information of a PCB are not provided in advance.

Therefore, the conventional methods require more design cycles and larger chip size, and result in worse IR drops.

SUMMARY

In accordance with exemplary embodiments of the present invention, a method for flip chip packaging co-design which can provide a bi-directional flip-chip co-design flow, analyze chip-aware bump pitches, simulate IR-aware bump counts/locations, speed up design cycle, increase design quality, and lower design cost are proposed to solve the above-mentioned problem.

According to a first aspect of the present invention, an exemplary method for flip chip packaging co-design is disclosed. The method comprises steps of: providing an Input/Output (I/O) pad information of a chip and a connection information of a PCB; performing a first I/O pad placement according to the I/O pad information of the chip and the connection information of the PCB; utilizing a redistribution layer (RDL) routing analysis device to perform a bump pad pitch analysis for the first I/O pad placement of the chip to generate a bump pad pitch analysis result; performing a bump pad planning for a package according to the bump pad pitch analysis result to generate a bump pad planning result; and performing a second I/O pad placement for the chip according to the bump pad planning result to generate an I/O pad placement result.

According to a second aspect of the present invention, an exemplary method for flip chip packaging co-design is disclosed. The method comprises steps of: providing a power domain information of the chip, an I/O pad information of a chip, and a connection information of a PCB; performing a first I/O pad placement according to the power domain information of the chip, the I/O pad information of the chip, and the connection information of the PCB; utilizing an IR drop analysis device to perform a bump pad count/location analysis for a plurality of power domains of the chip to generate a bump pad count/location analysis result; performing a bump pad planning for a package according to the bump pad count/location analysis result to generate a bump pad planning result; and performing a second I/O pad placement for the chip according to the bump pad planning result to generate an I/O pad placement result.

Briefly summarized, the present invention can provide a bi-directional flip-chip co-design flow since the I/O information, the RDL routing information, and the power domain information of the chip and the connection information of a PCB are provided in advance and the bump pitches for the I/O pad placement and RDL routing and the required bump counts/locations for IR drop are decided before the package design. Comparing with the conventional co-design method for the flip chip, the present invention has advantages of providing the bi-directional flip-chip co-design flow, analyzing the chip-aware bump pitches, simulating the IR-aware bump counts/locations, speeding up the design cycle (i.e. fewer design cycles), increasing the design quality (i.e. better IR drop), and lowering the design cost (i.e. smaller chip size).

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
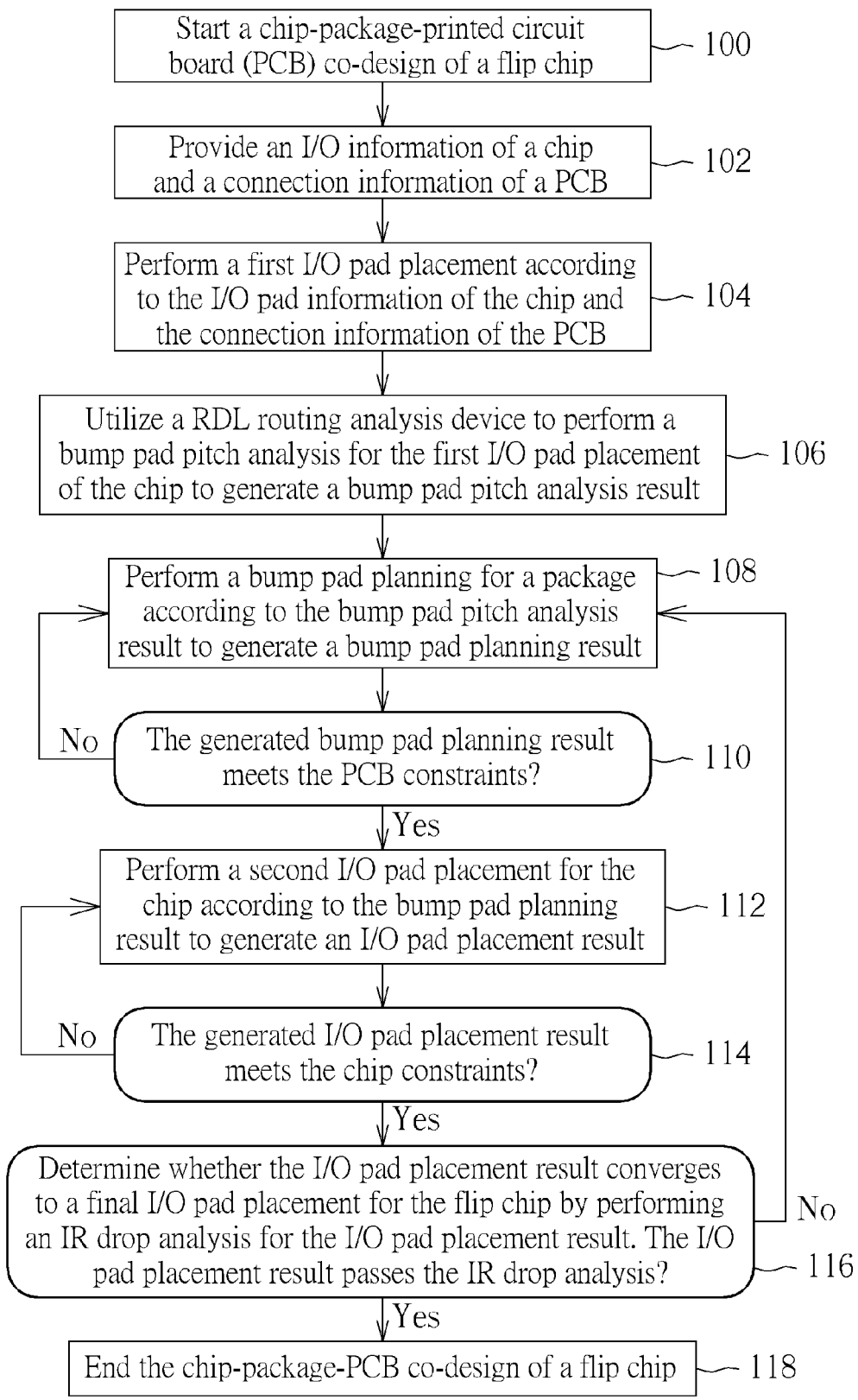
FIG. 1 is a flowchart showing a method for flip chip packaging co-design in accordance with a first exemplary embodiment of the present invention.

Please refer to FIG. 1. FIG. 1 is a flowchart showing a method for flip chip packaging co-design in accordance with a first exemplary embodiment of the present invention, wherein the flip chip can be applied to an SOC integrated circuit. Provided that the result is substantially the same, the steps in FIG. 1 are not required to be executed in the exact order shown in FIG. 1. The method in accordance with the first exemplary embodiment of the present invention comprises the following steps:

Step 100: Start a chip-package-printed circuit board (PCB) co-design of a flip chip.
Step 102: Provide an Input/Output (I/O) information of a chip and a connection information of a PCB.
Step 104: Perform a first I/O pad placement according to the I/O pad information of the chip and the connection information of the PCB.
Step 106: Utilize a redistribution layer (RDL) routing analysis device to perform a bump pad pitch analysis for the first I/O pad placement of the chip to generate a bump pad pitch analysis result.
Step 108: Perform a bump pad planning for a package according to the bump pad pitch analysis result to generate a bump pad planning result
Step 110: Review the PCB constraints of the flip chip; if the generated bump pad planning result meets the PCB constraints, then remain the generated bump pad planning result and go to Step 112; and if the generated bump pad planning result fails to meet the PCB constraints, then go back to Step 108 to perform the bump pad planning for the package again.
Step 112: Perform a second I/O pad placement for the chip according to the bump pad planning result to generate an I/O pad placement result.
Step 114: Review the chip constraints of the flip chip after performing the second I/O pad placement for the chip; if the generated I/O pad placement result meets the chip constraints then remain the I/O pad placement result and go to Step 116; and if the generated I/O pad placement result fails to meet the chip constraints, then go back to Step 112 to perform the I/O pad placement for the chip again.
Step 116: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 118; and if the I/O pad placement result fails to pass the IR drop analysis, then go back to Step 108 to perform the bump pad planning for the package again.
Step 118: End the chip-package-PCB co-design of a flip chip.

Briefly summarized, the first exemplary embodiment of the present invention can provide a bi-directional flip-chip co-design flow since the I/O information of the chip and the connection information of the PCB are provided in advance and the bump pitches for the I/O pad placement are decided before the package design. Comparing with the conventional co-design method for the flip chip, the present invention has advantages of providing the bi-directional flip-chip co-design flow, analyzing the chip-aware bump pitches, speeding up the design cycle (i.e. fewer design cycles), increasing the design quality (i.e. better IR drop), and lowering the design cost (i.e. smaller chip size). Please note that the above embodiment is only for an illustrative purpose and is not meant to be a limitation of the present invention.

Figure 2:
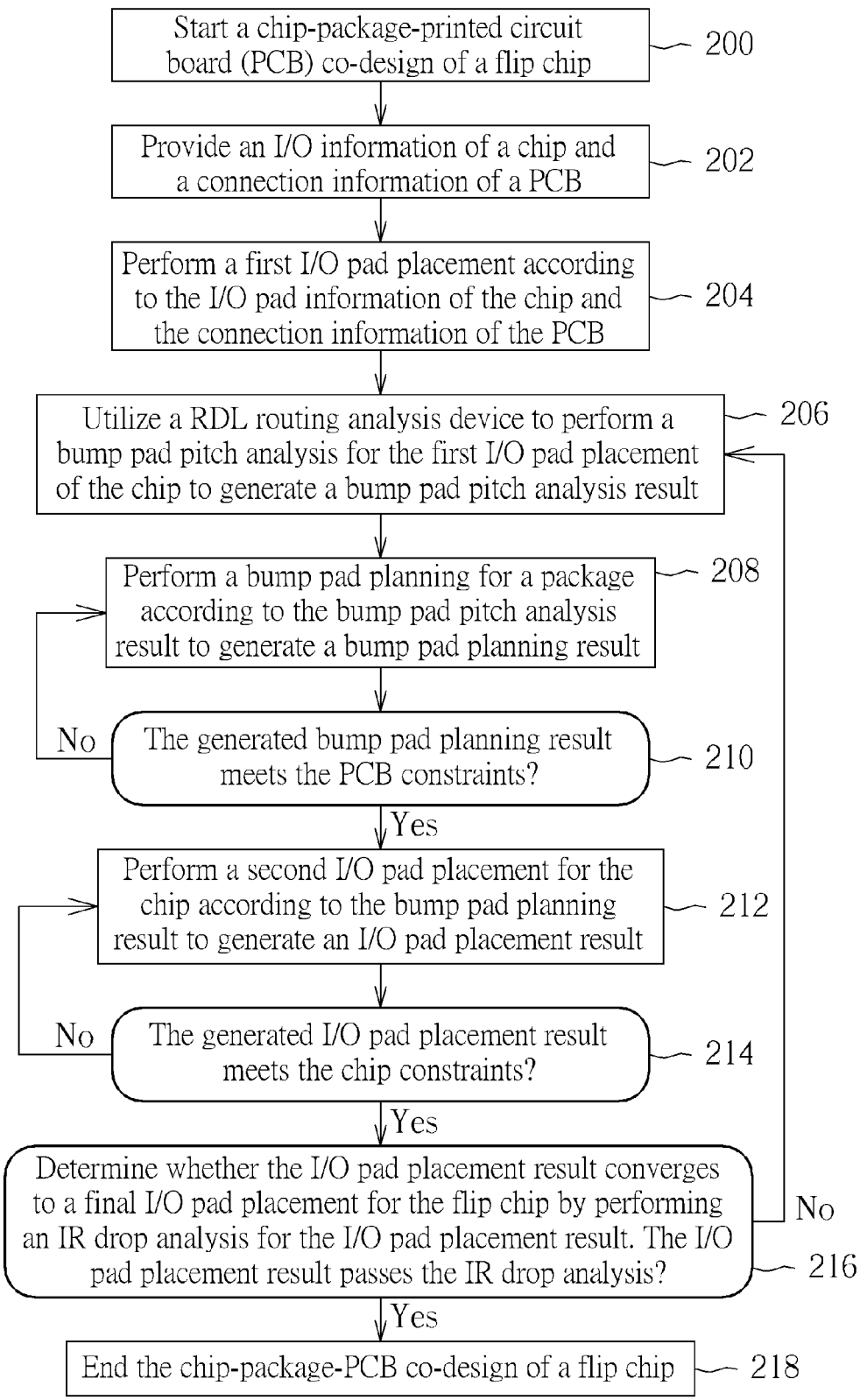
FIG. 2 is a flowchart showing a method for flip chip packaging co-design in accordance with a second exemplary embodiment of the present invention.

Please refer to FIG. 2. FIG. 2 is a flowchart showing a method for flip chip packaging co-design in accordance with a second exemplary embodiment of the present invention, wherein the flip chip can be applied to an SOC integrated circuit. Provided that the result is substantially the same, the steps in FIG. 2 are not required to be executed in the exact order shown in FIG. 2. The method in accordance with the second exemplary embodiment of the present invention comprises the following steps:

Step 200: Start a chip-package-PCB co-design of a flip chip.
Step 202: Provide an I/O information of a chip and a connection information of a PCB.
Step 204: Perform a first I/O pad placement according to the I/O pad information of the chip and the connection information of the PCB.
Step 206: Utilize an RDL routing analysis device to perform a bump pad pitch analysis for the first I/O pad placement of the chip to generate a bump pad pitch analysis result.
Step 208: Perform a bump pad planning for a package according to the bump pad pitch analysis result to generate a bump pad planning result
Step 210: Review the PCB constraints of the flip chip; if the generated bump pad planning result meets the PCB constraints, then remain the generated bump pad planning result and go to Step 212; and if the generated bump pad planning result fails to meet the PCB constraints, then go back to Step 208 to perform the bump pad planning for the package again.
Step 212: Perform a second I/O pad placement for the chip according to the bump pad planning result to generate an I/O pad placement result.
Step 214: Review the chip constraints of the flip chip after performing the second I/O pad placement for the chip; if the generated I/O pad placement result meets the chip constraints then remain the I/O pad placement result and go to Step 216; and if the generated I/O pad placement result fails to meet the chip constraints, then go back to Step 212 to perform the I/O pad placement for the chip again.
Step 216: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 218; and if the I/O pad placement result fails to pass the IR drop analysis, then go back to Step 206 to perform the bump pad pitch analysis for the first I/O pad placement of the chip again.
Step 218: End the chip-package-PCB co-design of a flip chip.

Briefly summarized, the second exemplary embodiment of the present invention can provide a bi-directional flip-chip co-design flow since the I/O information of the chip and the connection information of the PCB are provided in advance and the bump pitches for the I/O pad placement are decided before the package design. Comparing with the conventional co-design method for the flip chip, the present invention has advantages of providing the bi-directional flip-chip co-design flow, analyzing the chip-aware bump pitches, speeding up the design cycle (i.e. fewer design cycles), increasing the design quality (i.e. better IR drop), and lowering the design cost (i.e. smaller chip size). Please note that the above embodiment is only for an illustrative purpose and is not meant to be a limitation of the present invention.

Figure 3:
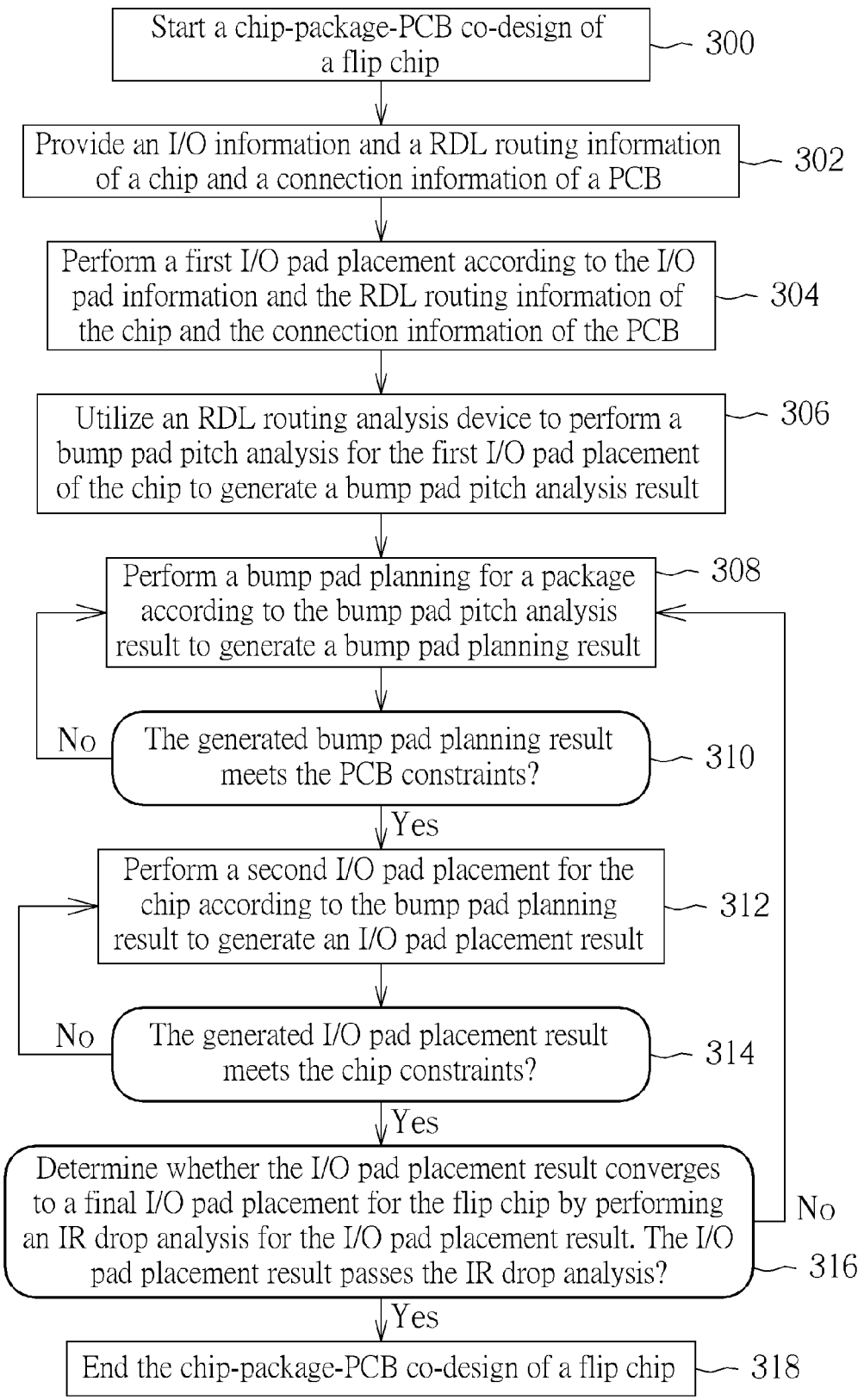
FIG. 3 is a flowchart showing a method for flip chip packaging co-design in accordance with a third exemplary embodiment of the present invention.

Please refer to FIG. 3. FIG. 3 is a flowchart showing a method for flip chip packaging co-design in accordance with a third exemplary embodiment of the present invention, wherein the flip chip can be applied to an SOC integrated circuit. Provided that the result is substantially the same, the steps in FIG. 3 are not required to be executed in the exact order shown in FIG. 3. The method in accordance with the third exemplary embodiment of the present invention comprises the following steps:

Step 300: Start a chip-package-PCB co-design of a flip chip.
Step 302: Provide an I/O information and a RDL routing information of a chip and a connection information of a PCB.
Step 304: Perform a first I/O pad placement according to the I/O pad information and the RDL routing information of the chip and the connection information of the PCB.
Step 306: Utilize an RDL routing analysis device to perform a bump pad pitch analysis for the first I/O pad placement of the chip to generate a bump pad pitch analysis result.
Step 308: Perform a bump pad planning for a package according to the bump pad pitch analysis result to generate a bump pad planning result
Step 310: Review the PCB constraints of the flip chip; if the generated bump pad planning result meets the PCB constraints, then remain the generated bump pad planning result and go to Step 312; and if the generated bump pad planning result fails to meet the PCB constraints, then go back to Step 308 to perform the bump pad planning for the package again.
Step 312: Perform a second I/O pad placement for the chip according to the bump pad planning result to generate an I/O pad placement result.
Step 314: Review the chip constraints of the flip chip after performing the second I/O pad placement for the chip; if the generated I/O pad placement result meets the chip constraints then remain the I/O pad placement result and go to Step 316; and if the generated I/O pad placement result fails to meet the chip constraints, then go back to Step 312 to perform the I/O pad placement for the chip again.
Step 316: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 318; and if the I/O pad placement result fails to pass the IR drop analysis, then go back to Step 308 to perform the bump pad planning for the package again.
Step 318: End the chip-package-PCB co-design of a flip chip.

Briefly summarized, the third exemplary embodiment of the present invention can provide a bi-directional flip-chip co-design flow since the I/O information and the RDL routing information of the chip and the connection information of the PCB are provided in advance and the bump pitches for the I/O pad placement and RDL routing are decided before the package design. Comparing with the conventional co-design method for the flip chip, the present invention has advantages of providing the bi-directional flip-chip co-design flow, analyzing the chip-aware bump pitches, speeding up the design cycle (i.e. fewer design cycles), increasing the design quality (i.e. better IR drop), and lowering the design cost (i.e. smaller chip size). Please note that the above embodiment is only for an illustrative purpose and is not meant to be a limitation of the present invention.

Figure 4:
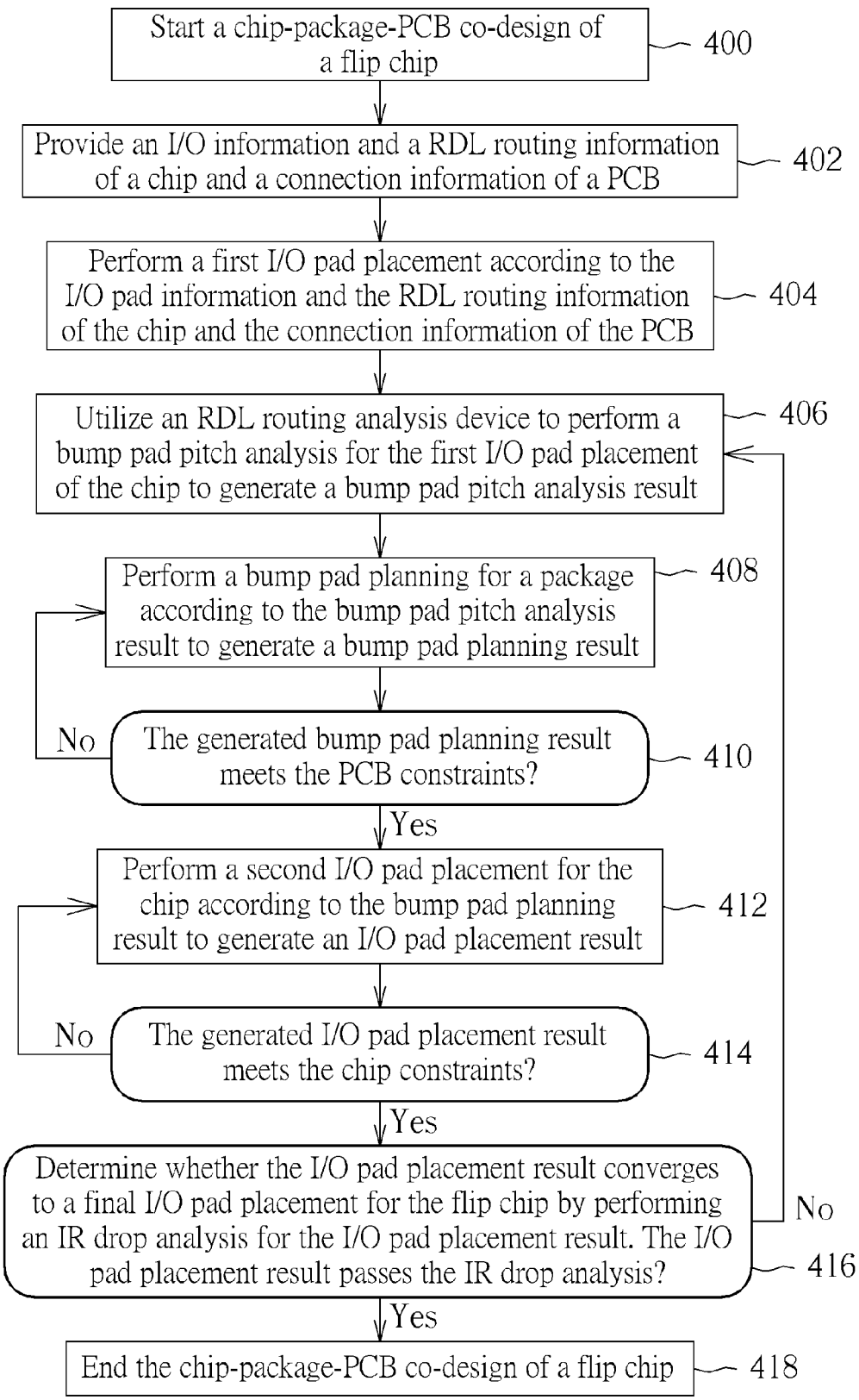
FIG. 4 is a flowchart showing a method for flip chip packaging co-design in accordance with a fourth exemplary embodiment of the present invention.

Please refer to FIG. 4. FIG. 4 is a flowchart showing a method for flip chip packaging co-design in accordance with a fourth exemplary embodiment of the present invention, wherein the flip chip can be applied to an SOC integrated circuit. Provided that the result is substantially the same, the steps in FIG. 4 are not required to be executed in the exact order shown in FIG. 4. The method in accordance with the fourth exemplary embodiment of the present invention comprises the following steps:

Step 400: Start a chip-package-PCB co-design of a flip chip.
Step 402: Provide an I/O information and a RDL routing information of a chip and a connection information of a PCB.
Step 404: Perform a first I/O pad placement according to the I/O pad information and the RDL routing information of the chip and the connection information of the PCB.
Step 406: Utilize an RDL routing analysis device to perform a bump pad pitch analysis for the first I/O pad placement of the chip to generate a bump pad pitch analysis result.
Step 408: Perform a bump pad planning for a package according to the bump pad pitch analysis result to generate a bump pad planning result.
Step 410: Review the PCB constraints of the flip chip; if the generated bump pad planning result meets the PCB constraints, then remain the generated bump pad planning result and go to Step 412; and if the generated bump pad planning result fails to meet the PCB constraints, then go back to Step 408 to perform the bump pad planning for the package again.
Step 412: Perform a second I/O pad placement for the chip according to the bump pad planning result to generate an I/O pad placement result.
Step 414: Review the chip constraints of the flip chip after performing the second I/O pad placement for the chip; if the generated I/O pad placement result meets the chip constraints then remain the I/O pad placement result and go to Step 416; and if the generated I/O pad placement result fails to meet the chip constraints, then go back to Step 412 to perform the I/O pad placement for the chip again.
Step 416: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 418; and if the I/O pad placement result fails to pass the IR drop analysis, then go back to Step 406 to perform the bump pad pitch analysis for the first I/O pad placement of the chip again.
Step 418: End the chip-package-PCB co-design of a flip chip.

Briefly summarized, the fourth exemplary embodiment of the present invention can provide a bi-directional flip-chip co-design flow since the I/O information and the RDL routing information of the chip and the connection information of the PCB are provided in advance and the bump pitches for the I/O pad placement and RDL routing are decided before the package design. Comparing with the conventional co-design method for the flip chip, the present invention has advantages of providing the bi-directional flip-chip co-design flow, analyzing the chip-aware bump pitches, speeding up the design cycle (i.e. fewer design cycles), increasing the design quality (i.e. better IR drop), and lowering the design cost (i.e. smaller chip size). Please note that the above embodiment is only for an illustrative purpose and is not meant to be a limitation of the present invention.

Figure 5:
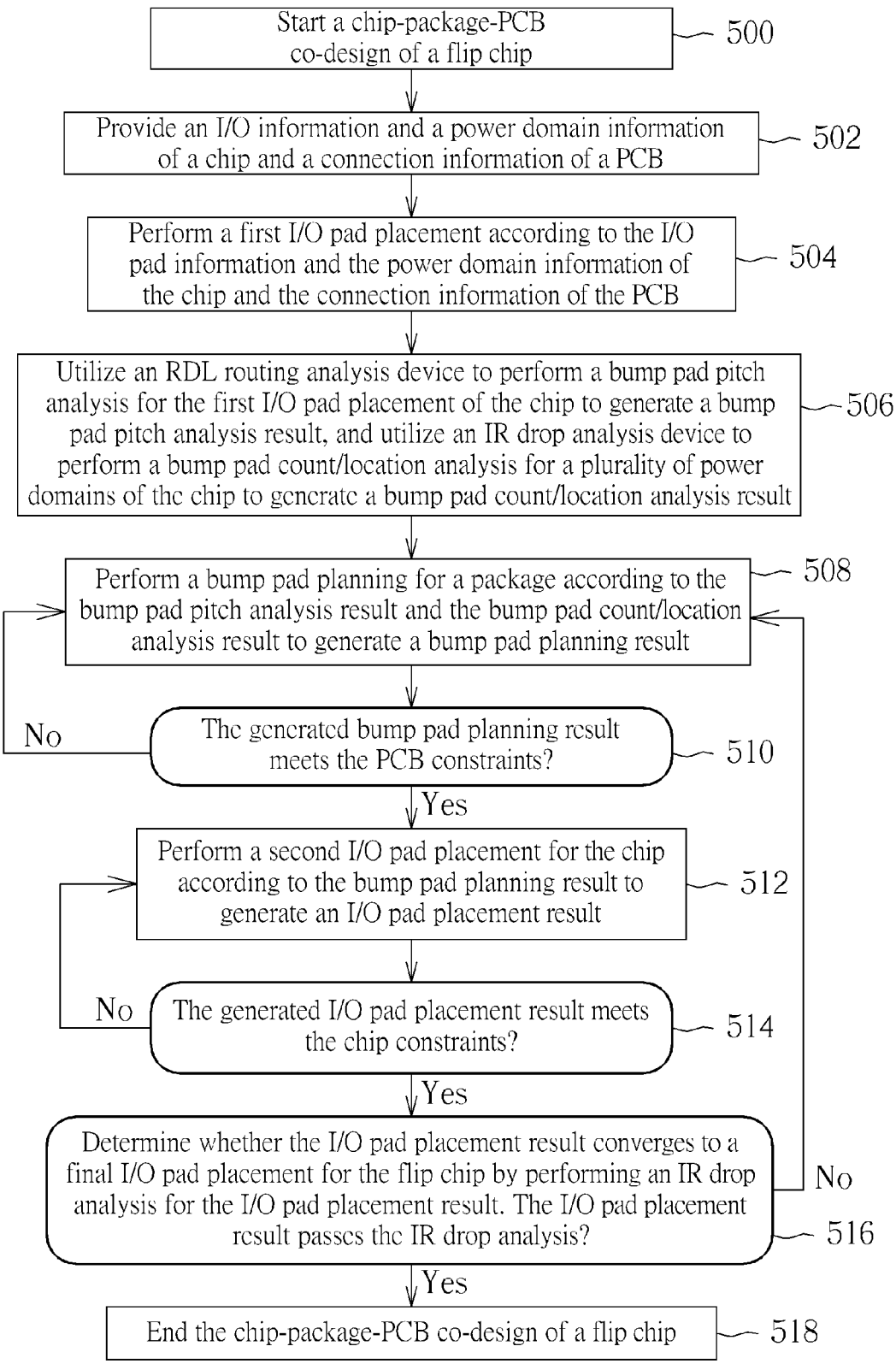
FIG. 5 is a flowchart showing a method for flip chip packaging co-design in accordance with a fifth exemplary embodiment of the present invention.

Please refer to FIG. 5. FIG. 5 is a flowchart showing a method for flip chip packaging co-design in accordance with a fifth exemplary embodiment of the present invention, wherein the flip chip can be applied to an SOC integrated circuit. Provided that the result is substantially the same, the steps in FIG. 5 are not required to be executed in the exact order shown in FIG. 5. The method in accordance with the fifth exemplary embodiment of the present invention comprises the following steps:

Step 500: Start a chip-package-PCB co-design of a flip chip.
Step 502: Provide an I/O information and a power domain information of a chip and a connection information of a PCB.
Step 504: Perform a first I/O pad placement according to the I/O pad information and the power domain information of the chip and the connection information of the PCB.
Step 506: Utilize an RDL routing analysis device to perform a bump pad pitch analysis for the first I/O pad placement of the chip to generate a bump pad pitch analysis result, and utilize an IR drop analysis device to perform a bump pad count/location analysis for a plurality of power domains of the chip to generate a bump pad count/location analysis result.
Step 508: Perform a bump pad planning for a package according to the bump pad pitch analysis result and the bump pad count/location analysis result to generate a bump pad planning result.
Step 510: Review the PCB constraints of the flip chip; if the generated bump pad planning result meets the PCB constraints, then remain the generated bump pad planning result and go to Step 512; and if the generated bump pad planning result fails to meet the PCB constraints, then go back to Step 508 to perform the bump pad planning for the package again.
Step 512: Perform a second I/O pad placement for the chip according to the bump pad planning result to generate an I/O pad placement result.
Step 514: Review the chip constraints of the flip chip after performing the second I/O pad placement for the chip; if the generated I/O pad placement result meets the chip constraints then remain the I/O pad placement result and go to Step 516; and if the generated I/O pad placement result fails to meet the chip constraints, then go back to Step 512 to perform the I/O pad placement for the chip again.
Step 516: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 518; and if the I/O pad placement result fails to pass the IR drop analysis, then go back to Step 508 to perform the bump pad planning for the package again.
Step 518: End the chip-package-PCB co-design of a flip chip.

Briefly summarized, the fifth exemplary embodiment of the present invention can provide a bi-directional flip-chip co-design flow since the I/O information of the chip and the connection information of a PCB are provided in advance and the bump pitches for the I/O pad placement and RDL routing and the required bump counts/locations for IR drop are decided before the package design. Comparing with the conventional co-design method for the flip chip, the present invention has advantages of providing the bi-directional flip-chip co-design flow, analyzing the chip-aware bump pitches, simulating the IR-aware bump counts/locations, speeding up the design cycle (i.e. fewer design cycles), increasing the design quality (i.e. better IR drop), and lowering the design cost (i.e. smaller chip size).

Figure 6:
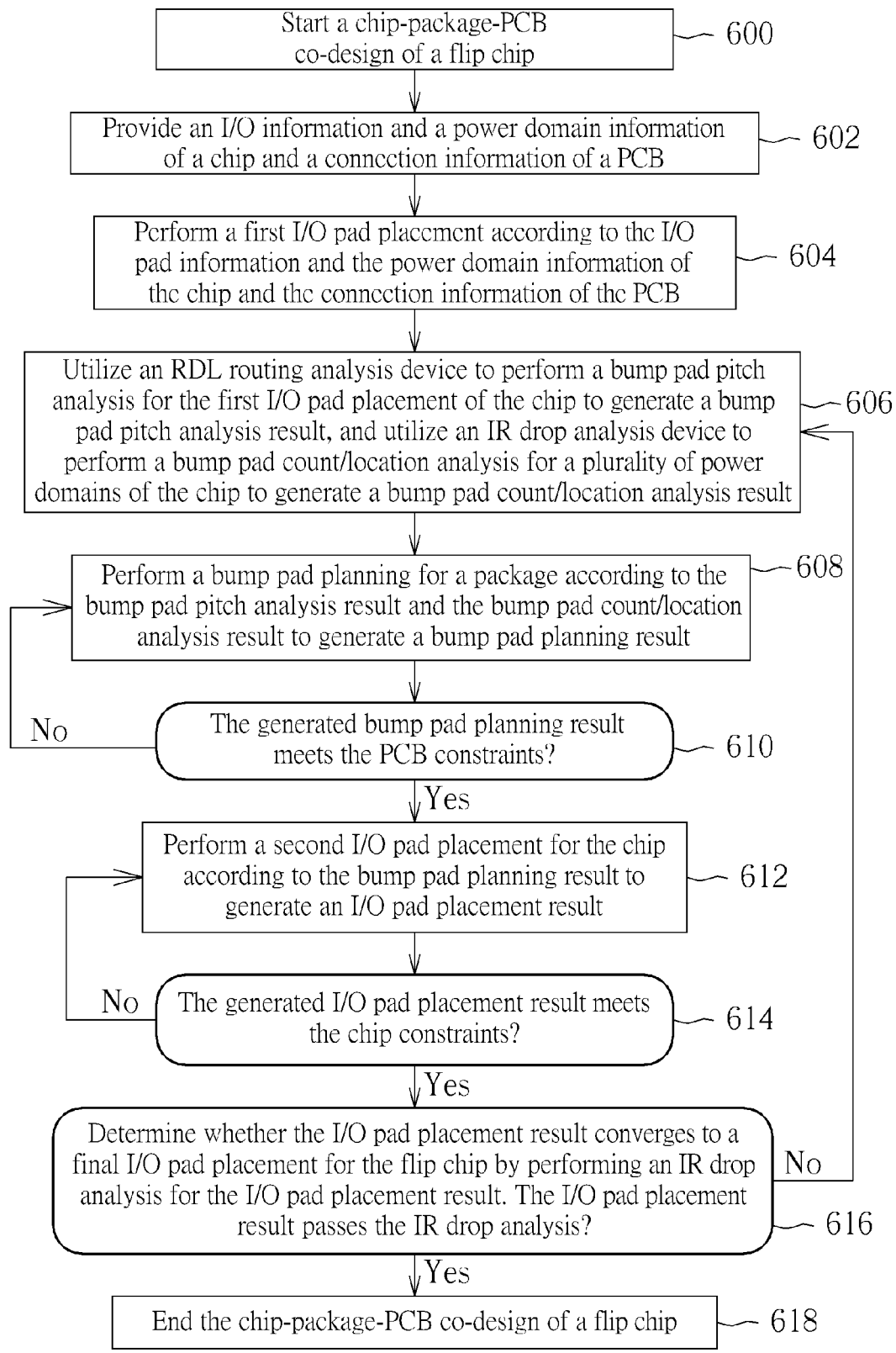
FIG. 6 is a flowchart showing a method for flip chip packaging co-design in accordance with a sixth exemplary embodiment of the present invention.

Please refer to FIG. 6. FIG. 6 is a flowchart showing a method for flip chip packaging co-design in accordance with a sixth exemplary embodiment of the present invention, wherein the flip chip can be applied to an SOC integrated circuit. Provided that the result is substantially the same, the steps in FIG. 6 are not required to be executed in the exact order shown in FIG. 6. The method in accordance with the sixth exemplary embodiment of the present invention comprises the following steps:

Step 600: Start a flip chip packaging co-design.
Step 602: Provide an I/O information and a power domain information of a chip and a connection information of a PCB.
Step 604: Perform a first I/O pad placement according to the I/O pad information and the power domain information of the chip and the connection information of the PCB.
Step 606: Utilize an RDL routing analysis device to perform a bump pad pitch analysis for the first I/O pad placement of the chip to generate a bump pad pitch analysis result, and utilize an IR drop analysis device to perform a bump pad count/location analysis for a plurality of power domains of the chip to generate a bump pad count/location analysis result.
Step 608: Perform a bump pad planning for a package according to the bump pad pitch analysis result and the bump pad count/location analysis result to generate a bump pad planning result.
Step 610: Review the PCB constraints of the flip chip; if the generated bump pad planning result meets the PCB constraints, then remain the generated bump pad planning result and go to Step 612; and if the generated bump pad planning result fails to meet the PCB constraints, then go back to Step 608 to perform the bump pad planning for the package again.
Step 612: Perform a second I/O pad placement for the chip according to the bump pad planning result to generate an I/O pad placement result.
Step 614: Review the chip constraints of the flip chip after performing the second I/O pad placement for the chip; if the generated I/O pad placement result meets the chip constraints then remain the I/O pad placement result and go to Step 616; and if the generated I/O pad placement result fails to meet the chip constraints, then go back to Step 612 to perform the I/O pad placement for the chip again.
Step 616: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 618; and if the I/O pad placement result fails to pass the IR drop analysis, then go back to Step 606 to perform the bump pad pitch analysis and/or the bump pad count/location analysis for the first I/O pad placement of the chip again.

Step 618: End the chip-package-PCB co-design of a flip chip.

Briefly summarized, the sixth exemplary embodiment of the present invention can provide a bi-directional flip-chip co-design flow since the I/O information of the chip and the connection information of a PCB are provided in advance and the bump pitches for the I/O pad placement and RDL routing and the required bump counts/locations for IR drop are decided before the package design. Comparing with the conventional co-design method for the flip chip, the present invention has advantages of providing the bi-directional flip-chip co-design flow, analyzing the chip-aware bump pitches, simulating the IR-aware bump counts/locations, speeding up the design cycle (i.e. fewer design cycles), increasing the design quality (i.e. better IR drop), and lowering the design cost (i.e. smaller chip size).

Figure 7:
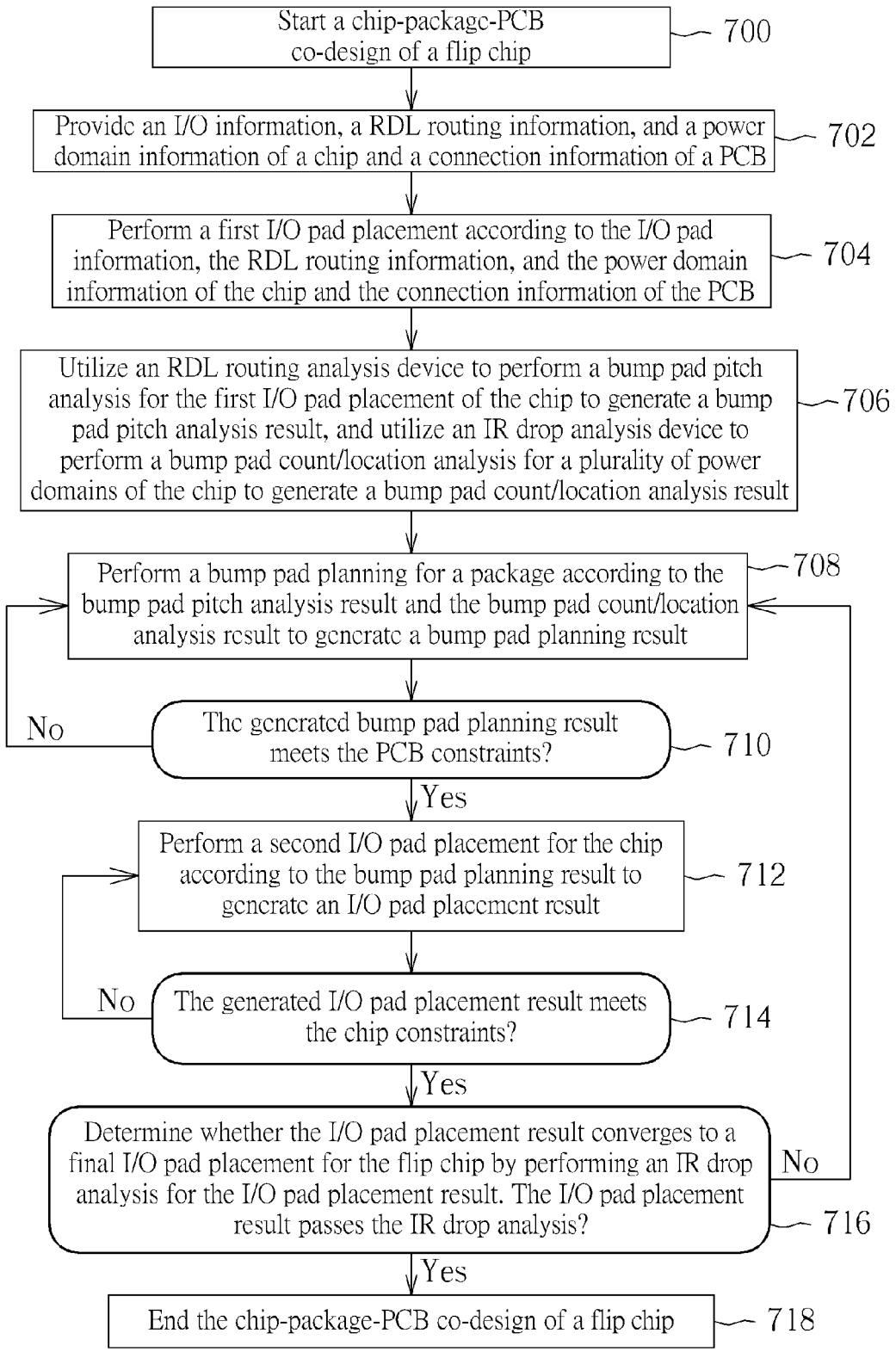
FIG. 7 is a flowchart showing a method for flip chip packaging co-design in accordance with a seventh exemplary embodiment of the present invention.

Please refer to FIG. 7. FIG. 7 is a flowchart showing a method for flip chip packaging co-design in accordance with a seventh exemplary embodiment of the present invention, wherein the flip chip can be applied to an SOC integrated circuit. Provided that the result is substantially the same, the steps in FIG. 7 are not required to be executed in the exact order shown in FIG. 7. The method in accordance with the seventh exemplary embodiment of the present invention comprises the following steps:

Step 700: Start a chip-package-PCB co-design of a flip chip.
Step 702: Provide an I/O information, a RDL routing information, and a power domain information of a chip and a connection information of a PCB.
Step 704: Perform a first I/O pad placement according to the I/O pad information, the RDL routing information, and the power domain information of the chip and the connection information of the PCB.
Step 706: Utilize an RDL routing analysis device to perform a bump pad pitch analysis for the first I/O pad placement of the chip to generate a bump pad pitch analysis result, and utilize an IR drop analysis device to perform a bump pad count/location analysis for a plurality of power domains of the chip to generate a bump pad count/location analysis result.
Step 708: Perform a bump pad planning for a package according to the bump pad pitch analysis result and the bump pad count/location analysis result to generate a bump pad planning result.
Step 710: Review the PCB constraints of the flip chip; if the generated bump pad planning result meets the PCB constraints, then remain the generated bump pad planning result and go to Step 712; and if the generated bump pad planning result fails to meet the PCB constraints, then go back to Step 708 to perform the bump pad planning for the package again.
Step 712: Perform a second I/O pad placement for the chip according to the bump pad planning result to generate an I/O pad placement result.
Step 714: Review the chip constraints of the flip chip after performing the second I/O pad placement for the chip; if the generated I/O pad placement result meets the chip constraints then remain the I/O pad placement result and go to Step 716; and if the generated I/O pad placement result fails to meet the chip constraints, then go back to Step 712 to perform the I/O pad placement for the chip again.
Step 716: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 718; and if the I/O pad placement result fails to pass the IR drop analysis, then go back to Step 708 to perform the bump pad planning for the package again.
Step 718: End the chip-package-PCB co-design of a flip chip.

Briefly summarized, the seventh exemplary embodiment of the present invention can provide a bi-directional flip-chip co-design flow since the I/O information, the RDL routing information, and the power domain information of the chip and the connection information of a PCB are provided in advance and the bump pitches for the I/O pad placement and RDL routing and the required bump counts/locations for IR drop are decided before the package design. Comparing with the conventional co-design method for the flip chip, the present invention has advantages of providing the bi-directional flip-chip co-design flow, analyzing the chip-aware bump pitches, simulating the IR-aware bump counts/locations, speeding up the design cycle (i.e. fewer design cycles), increasing the design quality (i.e. better IR drop), and lowering the design cost (i.e. smaller chip size).

Figure 8:
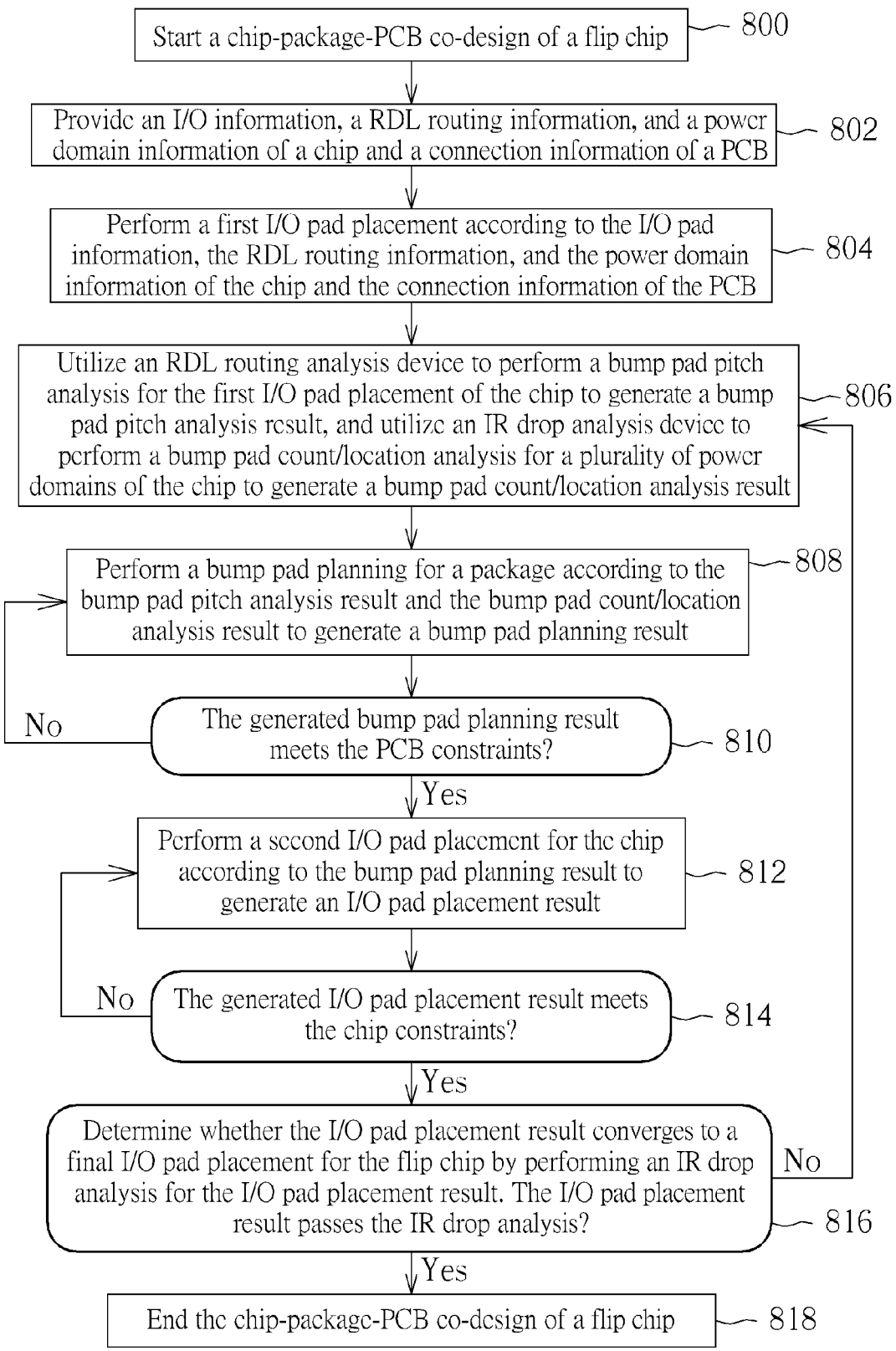
FIG. 8 is a flowchart showing a method for flip chip packaging co-design in accordance with an eighth exemplary embodiment of the present invention.

Please refer to FIG. 8. FIG. 8 is a flowchart showing a method for flip chip packaging co-design in accordance with an eighth exemplary embodiment of the present invention, wherein the flip chip can be applied to an SOC integrated circuit. Provided that the result is substantially the same, the steps in FIG. 8 are not required to be executed in the exact order shown in FIG. 8. The method in accordance with the eighth exemplary embodiment of the present invention comprises the following steps:

Step 800: Start a chip-package-PCB co-design of a flip chip.
Step 802: Provide an I/O information, a RDL routing information, and a power domain information of a chip and a connection information of a PCB.
Step 804: Perform a first I/O pad placement according to the I/O pad information, the RDL routing information, and the power domain information of the chip and the connection information of the PCB.
Step 806: Utilize an RDL routing analysis device to perform a bump pad pitch analysis for the first I/O pad placement of the chip to generate a bump pad pitch analysis result, and utilize an IR drop analysis device to perform a bump pad count/location analysis for a plurality of power domains of the chip to generate a bump pad count/location analysis result.
Step 808: Perform a bump pad planning for a package according to the bump pad pitch analysis result and the bump pad count/location analysis result to generate a bump pad planning result.
Step 810: Review the PCB constraints of the flip chip; if the generated bump pad planning result meets the PCB constraints, then remain the generated bump pad planning result and go to Step 812; and if the generated bump pad planning result fails to meet the PCB constraints, then go back to Step 808 to perform the bump pad planning for the package again.
Step 812: Perform a second I/O pad placement for the chip according to the bump pad planning result to generate an I/O pad placement result.
Step 814: Review the chip constraints of the flip chip after performing the second I/O pad placement for the chip; if the generated I/O pad placement result meets the chip constraints then remain the I/O pad placement result and go to Step 816; and if the generated I/O pad placement result fails to meet the chip constraints, then go back to Step 812 to perform the I/O pad placement for the chip again.
Step 816: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 818; and if the I/O pad placement result fails to pass the IR drop analysis, then go back to Step 806 to perform the bump pad pitch analysis and/or the bump pad count/location analysis for the first I/O pad placement of the chip again.

Step 818: End the chip-package-PCB co-design of a flip chip.

Briefly summarized, the eighth exemplary embodiment of the present invention can provide a bi-directional flip-chip co-design flow since the I/O information, the RDL routing information, and the power domain information of the chip and the connection information of a PCB are provided in advance and the bump pitches for the I/O pad placement and RDL routing and the required bump counts/locations for IR drop are decided before the package design. Comparing with the conventional co-design method for the flip chip, the present invention has advantages of providing the bi-directional flip-chip co-design flow, analyzing the chip-aware bump pitches, simulating the IR-aware bump counts/locations, speeding up the design cycle (i.e. fewer design cycles), increasing the design quality (i.e. better IR drop), and lowering the design cost (i.e. smaller chip size).

Figure 9:
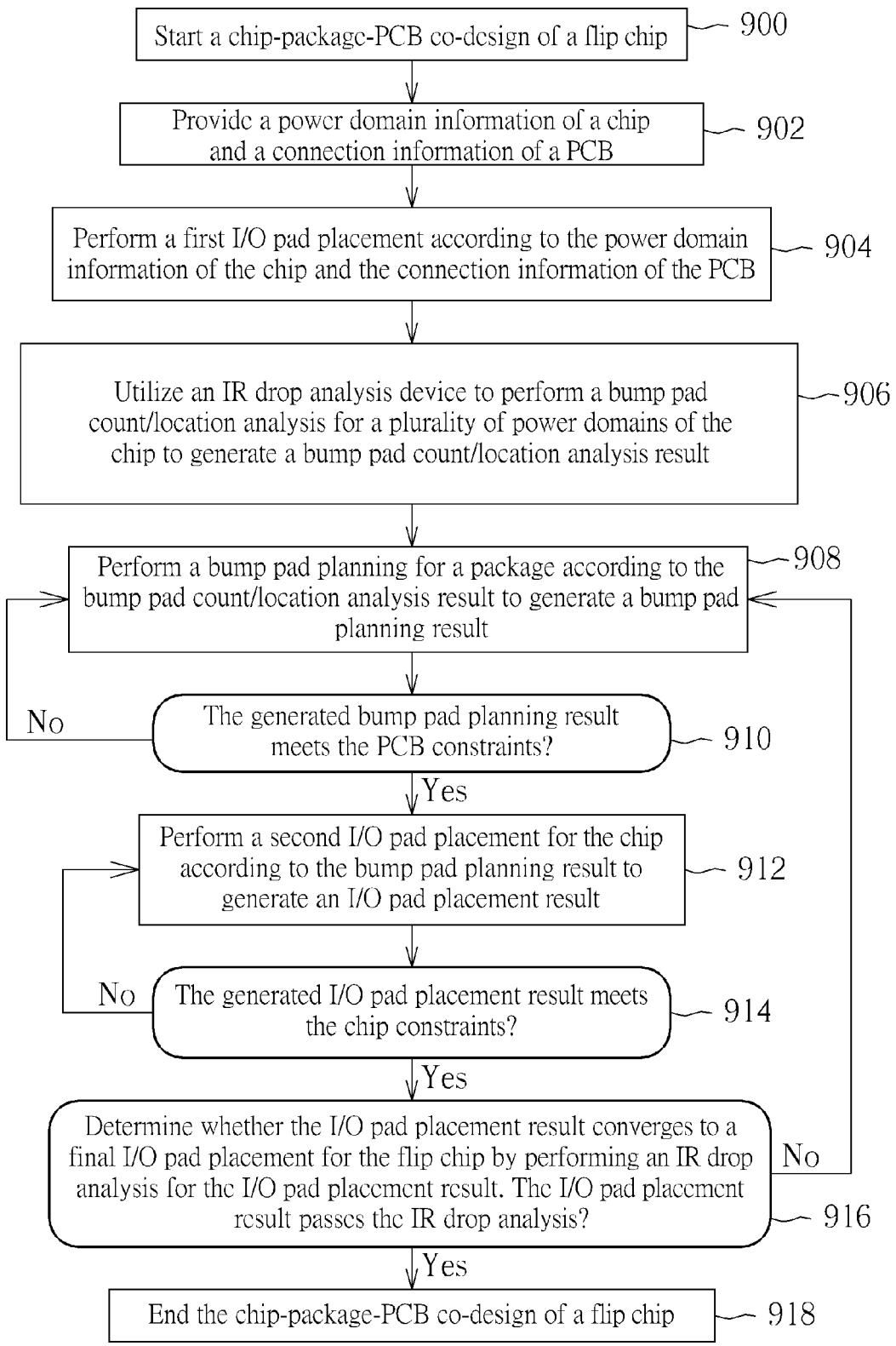
FIG. 9 is a flowchart showing a method for flip chip packaging co-design in accordance with a ninth exemplary embodiment of the present invention.

Please refer to FIG. 9. FIG. 9 is a flowchart showing a method for flip chip packaging co-design in accordance with a ninth exemplary embodiment of the present invention, wherein the flip chip can be applied to an SOC integrated circuit. Provided that the result is substantially the same, the steps in FIG. 9 are not required to be executed in the exact order shown in FIG. 9. The method in accordance with the ninth exemplary embodiment of the present invention comprises the following steps:

Step 900: Start a chip-package-PCB co-design of a flip chip.

Step 902: Provide a power domain information of a chip and a connection information of a PCB.

Step 904: Perform a first I/O pad placement according to the power domain information of the chip and the connection information of the PCB.

Step 906: Utilize an IR drop analysis device to perform a bump pad count/location analysis for a plurality of power domains of the chip to generate a bump pad count/location analysis result.

Step 908: Perform a bump pad planning for a package according to the bump pad count/location analysis result to generate a bump pad planning result Step 910: Review the PCB constraints of the flip chip; if the generated bump pad planning result meets the PCB constraints, then remain the generated bump pad planning result and go to Step 912; and if the generated bump pad planning result fails to meet the PCB constraints, then go back to Step 908 to perform the bump pad planning for the package again.

Step 912: Perform a second I/O pad placement for the chip according to the bump pad planning result to generate an I/O pad placement result.

Step 914: Review the chip constraints of the flip chip after performing the second I/O pad placement for the chip; if the generated I/O pad placement result meets the chip constraints then remain the I/O pad placement result and go to Step 916; and if the generated I/O pad placement result fails to meet the chip constraints, then go back to Step 912 to perform the I/O pad placement for the chip again.

Step 916: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 918; and if the I/O pad placement result fails to pass the IR drop analysis, then go back to Step 908 to perform the bump pad planning for the package again.

Step 918: End the chip-package-PCB co-design of a flip chip.

Briefly summarized, the ninth exemplary embodiment of the present invention can provide a bi-directional flip-chip co-design flow since the power domain information of the chip and the connection information of a PCB are provided in advance and the required bump counts/locations for IR drop are decided before the package design. Comparing with the conventional co-design method for the flip chip, the present invention has advantages of providing the bi-directional flip-chip co-design flow, simulating the IR-aware bump counts/locations, speeding up the design cycle (i.e. fewer design cycles), increasing the design quality (i.e. better IR drop), and lowering the design cost (i.e. smaller chip size).

Figure 10:
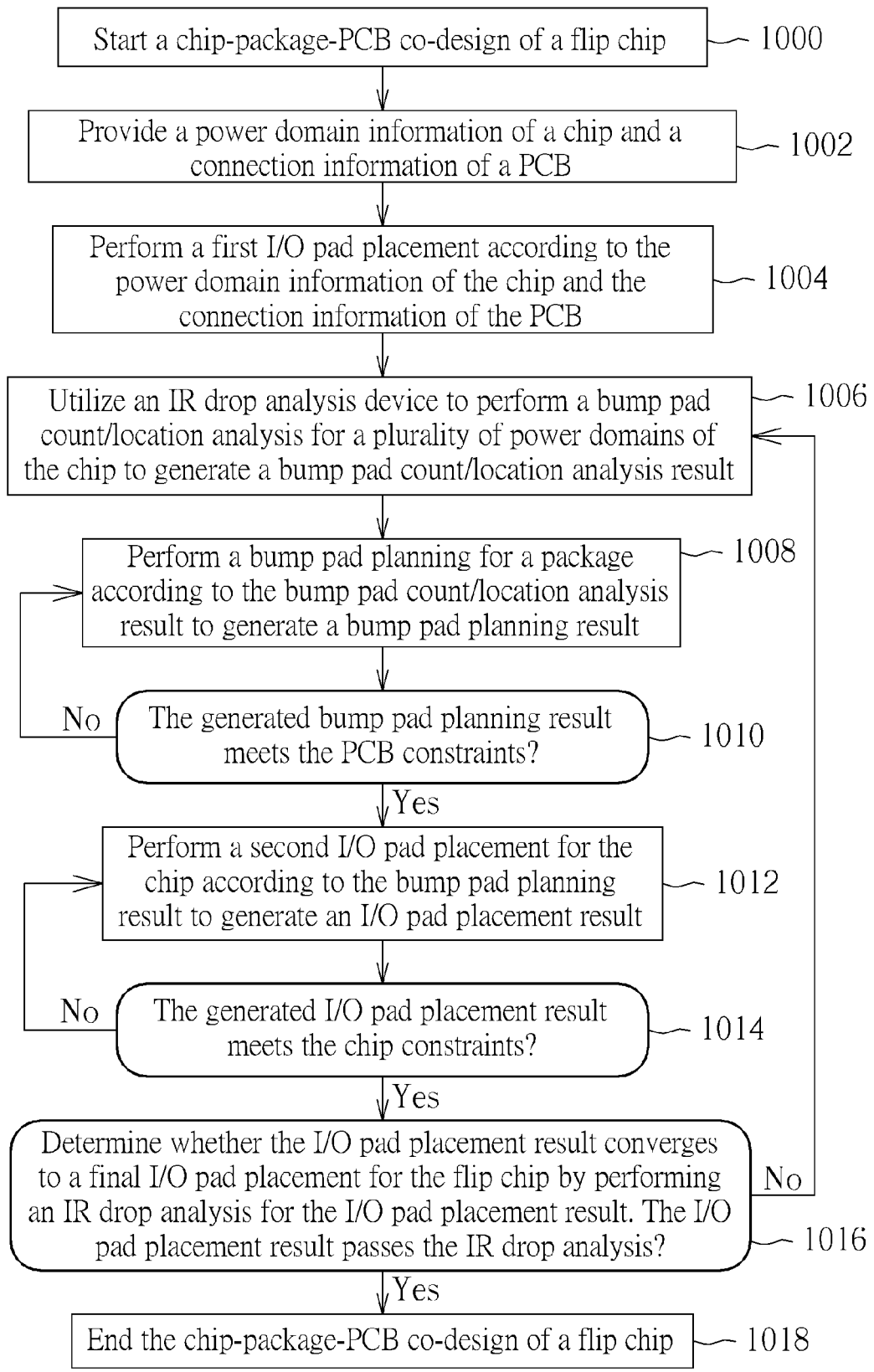
FIG. 10 is a flowchart showing a method for flip chip packaging co-design in accordance with a tenth exemplary embodiment of the present invention.

Please refer to FIG. 10. FIG. 10 is a flowchart showing a method for flip chip packaging co-design in accordance with a tenth exemplary embodiment of the present invention, wherein the flip chip can be applied to an SOC integrated circuit. Provided that the result is substantially the same, the steps in FIG. 10 are not required to be executed in the exact order shown in FIG. 10. The method in accordance with the tenth exemplary embodiment of the present invention comprises the following steps:

Step 1000: Start a chip-package-PCB co-design of a flip chip.

Step 1002: Provide a power domain information of a chip and a connection information of a PCB.

Step 1004: Perform a first I/O pad placement according to the power domain information of the chip and the connection information of the PCB.

Step 1006: Utilize an IR drop analysis device to perform a bump pad count/location analysis for a plurality of power domains of the chip to generate a bump pad count/location analysis result.

Step 1008: Perform a bump pad planning for a package according to the bump pad count/location analysis result to generate a bump pad planning result Step 1010: Review the PCB constraints of the flip chip; if the generated bump pad planning result meets the PCB constraints, then remain the generated bump pad planning result and go to Step 1012; and if the generated bump pad planning result fails to meet the PCB constraints, then go back to Step 1008 to perform the bump pad planning for the package again.

Step 1012: Perform a second I/O pad placement for the chip according to the bump pad planning result to generate an I/O pad placement result.

Step 1014: Review the chip constraints of the flip chip after performing the second I/O pad placement for the chip; if the generated I/O pad placement result meets the chip constraints then remain the I/O pad placement result and go to Step 1016; and if the generated I/O pad placement result fails to meet the chip constraints, then go back to Step 1012 to perform the I/O pad placement for the chip again.

Step 1016: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 1018;

and if the I/O pad placement result fails to pass the IR drop analysis, then go back to Step 1006 to perform the bump pad count/location analysis for the first I/O pad placement of the chip again.

Step 1018: End the chip-package-PCB co-design of a flip chip.

Briefly summarized, the tenth exemplary embodiment of the present invention can provide a bi-directional flip-chip co-design flow since the power domain information of the chip and the connection information of a PCB are provided in advance and the required bump counts/locations for IR drop are decided before the package design. Comparing with the conventional co-design method for the flip chip, the present invention has advantages of providing the bi-directional flip-chip co-design flow, simulating the IR-aware bump counts/locations, speeding up the design cycle (i.e. fewer design cycles), increasing the design quality (i.e. better IR drop), and lowering the design cost (i.e. smaller chip size).

Figure 11:
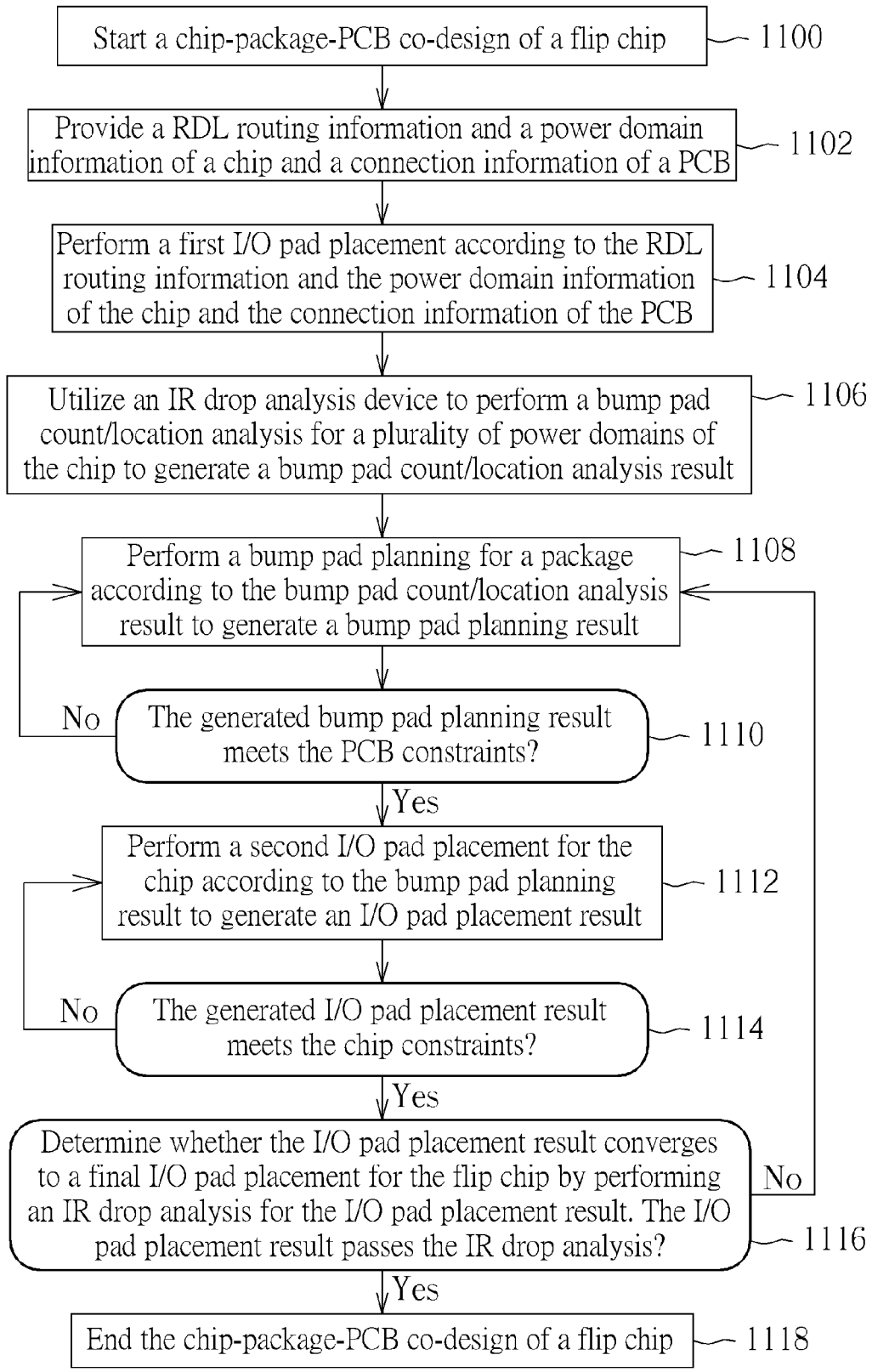
FIG. 11 is a flowchart showing a method for flip chip packaging co-design in accordance with an eleventh exemplary embodiment of the present invention.

Please refer to FIG. 11. FIG. 11 is a flowchart showing a method for flip chip packaging co-design in accordance with an eleventh exemplary embodiment of the present invention, wherein the flip chip can be applied to an SOC integrated circuit. Provided that the result is substantially the same, the steps in FIG. 11 are not required to be executed in the exact order shown in FIG. 11. The method in accordance with the eleventh exemplary embodiment of the present invention comprises the following steps:

Step 1100: Start a chip-package-PCB co-design of a flip chip.

Step 1102: Provide a RDL routing information and a power domain information of a chip and a connection information of a PCB.

Step 1104: Perform a first I/O pad placement according to the RDL routing information and the power domain information of the chip and the connection information of the PCB.

Step 1106: Utilize an IR drop analysis device to perform a bump pad count/location analysis for a plurality of power domains of the chip to generate a bump pad count/location analysis result.

Step 1108: Perform a bump pad planning for a package according to the bump pad count/location analysis result to generate a bump pad planning result Step 1110: Review the PCB constraints of the flip chip; if the generated bump pad planning result meets the PCB constraints, then remain the generated bump pad planning result and go to Step 1112; and if the generated bump pad planning result fails to meet the PCB constraints, then go back to Step 1108 to perform the bump pad planning for the package again.

Step 1112: Perform a second I/O pad placement for the chip according to the bump pad planning result to generate an I/O pad placement result.

Step 1114: Review the chip constraints of the flip chip after performing the second I/O pad placement for the chip; if the generated I/O pad placement result meets the chip constraints then remain the I/O pad placement result and go to Step 1116; and if the generated I/O pad placement result fails to meet the chip constraints, then go back to Step 1112 to perform the I/O pad placement for the chip again.

Step 1116: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 1118; and if the I/O pad placement result fails to pass the IR drop analysis, then go back to Step 1108 to perform the bump pad planning for the package again.

Step 1118: End the chip-package-PCB co-design of a flip chip.

Briefly summarized, the eleventh exemplary embodiment of the present invention can provide a bi-directional flip-chip co-design flow since the RDL routing information and the power domain information of the chip and the connection information of a PCB are provided in advance and the required bump counts/locations for IR drop are decided before the package design. Comparing with the conventional co-design method for the flip chip, the present invention has advantages of providing the bi-directional flip-chip co-design flow, simulating the IR-aware bump counts/locations, speeding up the design cycle (i.e. fewer design cycles), increasing the design quality (i.e. better IR drop), and lowering the design cost (i.e. smaller chip size).

Figure 12:
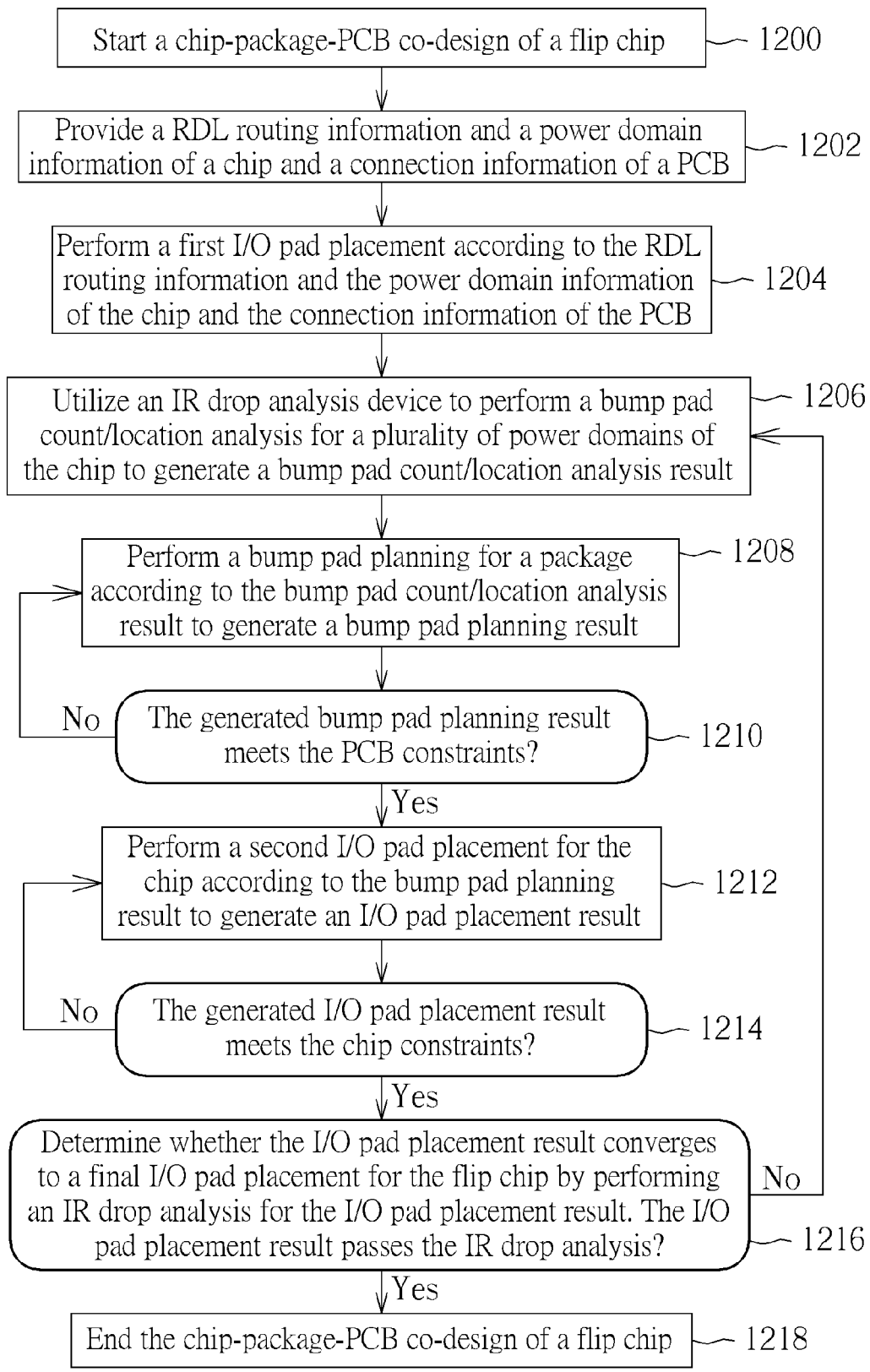
FIG. 12 is a flowchart showing a method for flip chip packaging co-design in accordance with a twelfth exemplary embodiment of the present invention.

Please refer to FIG. 12. FIG. 12 is a flowchart showing a method for flip chip packaging co-design in accordance with a twelfth exemplary embodiment of the present invention, wherein the flip chip can be applied to an SOC integrated circuit. Provided that the result is substantially the same, the steps in FIG. 12 are not required to be executed in the exact order shown in FIG. 12. The method in accordance with the twelfth exemplary embodiment of the present invention comprises the following steps:

Step 1200: Start a chip-package-PCB co-design of a flip chip.

Step 1202: Provide a RDL routing information and a power domain information of a chip and a connection information of a PCB.

Step 1204: Perform a first I/O pad placement according to the RDL routing information and the power domain information of the chip and the connection information of the PCB.

Step 1206: Utilize an IR drop analysis device to perform a bump pad count/location analysis for a plurality of power domains of the chip to generate a bump pad count/location analysis result.

Step 1208: Perform a bump pad planning for a package according to the bump pad count/location analysis result to generate a bump pad planning result Step 1210: Review the PCB constraints of the flip chip; if the generated bump pad planning result meets the PCB constraints, then remain the generated bump pad planning result and go to Step 1212; and if the generated bump pad planning result fails to meet the PCB constraints, then go back to Step 1208 to perform the bump pad planning for the package again.

Step 1212: Perform a second I/O pad placement for the chip according to the bump pad planning result to generate an I/O pad placement result.

Step 1214: Review the chip constraints of the flip chip after performing the second I/O pad placement for the chip; if the generated I/O pad placement result meets the chip constraints then remain the I/O pad placement result and go to Step 1216; and if the generated I/O pad placement result fails to meet the chip constraints, then go back to Step 1212 to perform the I/O pad placement for the chip again.

Step 1216: Determine whether the I/O pad placement result converges to a final I/O pad placement for the flip chip by performing an IR drop analysis for the I/O pad placement result; if the I/O pad placement result passes the IR drop analysis, then determine the I/O pad placement result converges to the final I/O pad placement and go to Step 1218; and if the I/O pad placement result fails to pass the IR drop analysis, then go back to Step 1206 to perform the bump pad count/location analysis for the first I/O pad placement of the chip again.

Step 1218: End the chip-package-PCB co-design of a flip chip.

Briefly summarized, the twelfth exemplary embodiment of the present invention can provide a bi-directional flip-chip co-design flow since the RDL routing information and the power domain information of the chip and the connection information of a PCB are provided in advance and the required bump counts/locations for IR drop are decided before the package design. Comparing with the conventional co-design method for the flip chip, the present invention has advantages of providing the bi-directional flip-chip co-design flow, simulating the IR-aware bump counts/locations, speeding up the design cycle (i.e. fewer design cycles), increasing the design quality (i.e. better IR drop), and lowering the design cost (i.e. smaller chip size).

It is understood that the present invention may be applied to any integrated circuit design, including platform-based integrated circuit design and the like, without departing from the scope and spirit of the present invention. A platform is a large-scale, high-complexity semiconductor device that includes one or more of the following elements: (1) memory; (2) a customizable array of transistors; (3) an IP (intellectual property) block; (4) a processor, e.g., an ESP (embedded standard product); (5) an embedded programmable logic block; and (6) interconnect. For example, RapidChip developed by LSI Logic Corp. is an instance of a platform. In addition, it is to be noted that the foregoing described embodiments according to the present invention may be conveniently implemented using conventional general purpose digital computers programmed according to the teachings of the present specification, as may be apparent to those skilled in the computer art. Appropriate software coding may readily be prepared by skilled programmers based on the teachings of the present disclosure, as may be apparent to those skilled in the software art.

Moreover, It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions. In addition, it is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

Briefly summarized, the present invention can provide a bi-directional flip-chip co-design flow since the I/O information, the RDL routing information, and the power domain information of the chip and the connection information of a PCB are provided in advance and the bump pitches for the I/O pad placement and RDL routing and the required bump counts/locations for IR drop are decided before the package design. Comparing with the conventional co-design method for the flip chip, the present invention has advantages of providing the bi-directional flip-chip co-design flow, analyzing the chip-aware bump pitches, simulating the IR-aware bump counts/locations, speeding up the design cycle (i.e. fewer design cycles), increasing the design quality (i.e. better IR drop), and lowering the design cost (i.e. smaller chip size). In addition, it is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for flip chip packaging co-design, the method comprising steps of:
   providing an Input/Output (I/O) pad information of a chip and a connection information of a PCB;
   performing an I/O pad placement according to the I/O pad information of the chip and the connection information of the PCB;
   utilizing a redistribution layer (RDL) routing analysis device to perform a bump pad pitch analysis for the I/O pad placement of the chip to generate a bump pad pitch analysis result;
   performing a bump pad planning for a package according to the bump pad pitch analysis result to generate a bump pad planning result; and
   adjusting the I/O pad placement for the chip according to the bump pad planning result to generate an I/O pad placement result.

2. The method of claim 1, wherein the step of performing the I/O pad placement is performed further according to a RDL routing information of the chip.

3. The method of claim 1, wherein the step of performing the I/O pad placement is performed further according to a power domain information of the chip.

4. The method of claim 3, further comprising:
   utilizing an IR drop analysis device to perform a bump pad count/location analysis for a plurality of power domains of the chip to generate a bump pad count/location analysis result.

5. The method of claim 4, wherein the step of performing the bump pad planning for the package is performed further according to the bump pad count/location analysis result of the chip.

6. The method of claim 1, further comprising:
   reviewing the PCB constraints of the flip chip after performing the bump pad planning for the package;
   remaining the generated bump pad planning result if the generated bump pad planning result meets the PCB constraints; and
   performing the bump pad planning for the package again if the generated bump pad planning result fails to meet the PCB constraints.

7. The method of claim 1, further comprising:
   reviewing the chip constraints of the flip chip after adjusting the I/O pad placement for the chip;

remaining the I/O pad placement result if the generated I/O pad placement result meets the chip constraints; and performing the I/O pad placement for the chip again if the generated I/O pad placement result fails to meet the chip constraints.

8. The method of claim 1, further comprising:

determining whether the I/O pad placement result converges to a final I/O pad placement for the flip chip by performing an IR drop analysis for the I/O pad placement result.

9. The method of claim 8, further comprising:

performing the bump pad planning for the package again if the I/O pad placement result fails to pass the IR drop analysis; and determining the I/O pad placement result converges to the final I/O pad placement for the flip chip if the I/O pad placement result passes the IR drop analysis.

10. The method of claim 8, further comprising:

utilizing the RDL routing analysis device to perform the bump pad pitch analysis for the first I/O pad placement of the chip again if the I/O pad placement result fails to pass the IR drop analysis; and determining the I/O pad placement result converges to the final I/O pad placement for the flip chip if the I/O PAD placement result passes the IR drop analysis.

11. An apparatus for flip chip packaging co-design, the apparatus comprising:

an I/O pad placement device, for performing an I/O pad placement according to an I/O pad information of a chip and a connection information of a PCB;

a redistribution layer (RDL) routing analysis device, for performing a bump pad pitch analysis for the I/O pad placement of the chip to generate a bump pad pitch analysis result; and an bump pad planning device, for performing a bump pad planning for a package according to the bump pad pitch analysis result to generate a bump pad planning result; and wherein the I/O pad placement device adjusts the I/O pad placement for the chip according to the bump pad planning result.

12. The apparatus of claim 11, wherein the chip further has a RDL routing information, and the I/O pad placement device further performs the I/O pad placement according to the RDL routing information of the chip.

13. The apparatus of claim 11, wherein the chip further has a power domain information, and the I/O pad placement device further performs the I/O pad placement according to the power domain information of the chip.

14. The apparatus of claim 13, further comprising:

an IR drop analysis device, for performing a bump pad count/location analysis for a plurality of power domains of the chip to generate a bump pad count/location analysis result.

15. The apparatus of claim 14, wherein the function of performing the bump pad planning for the package of the bump pad planning device is performed further according to the bump pad count/location analysis result of the chip.

16. A co-designed flip chip package, comprising:

a chip, having an Input/Output (I/O) pad information;

a PCB, having a connection information; and an I/O pad placement, disposed according to the I/O pad information of the chip and the connection information of the PCB;

wherein a redistribution layer (RDL) routing analysis device is utilized for performing a bump pad pitch analysis for the I/O pad placement of the chip to generate a bump pad pitch analysis result; and an bump pad planning device is utilized for performing a bump pad planning for a package according to the bump pad pitch analysis result.

17. The co-designed flip chip package of claim 16, wherein the I/O pad placement is adjusted for the chip according to a bump pad planning result generated from the bump pad planning device.

18. The apparatus of claim 16, wherein the chip further has a RDL routing information, and the I/O pad placement device further performs the I/O pad placement according to the RDL routing information of the chip.

19. The co-designed flip chip package of claim 16, wherein the chip further has a power domain information, and the I/O pad placement device further performs the I/O pad placement according to the power domain information of the chip.

20. The co-designed flip chip package of claim 16, wherein an IR drop analysis device is further utilized for performing a bump pad count/location analysis for a plurality of power domains of the chip to generate a bump pad count/location analysis result, and the function of performing the bump pad planning for the package of the bump pad planning device is performed further according to the bump pad count/location analysis result of the chip.

* * * * *